United States Patent [19]

Durdan et al.

[11] Patent Number: 5,058,006
[45] Date of Patent: Oct. 15, 1991

[54] METHOD AND APPARATUS FOR FILTERING INVALIDATE REQUESTS

[75] Inventors: W. Hugh Durdan, Waban; Rebecca L. Stamm, Newton; G. Michael Uhler, Marlboro, all of Mass.

[73] Assignee: Digital Equipment Corporation, Hudson, Mass.

[21] Appl. No.: 212,416

[22] Filed: Jun. 27, 1988

[51] Int. Cl.[5] .............................................. G06F 13/38
[52] U.S. Cl. ................................. 364/200; 364/228.1; 364/243.44; 364/246.4; 364/266.3; 364/931.46; 364/945.6; 364/964.32
[58] Field of Search ... 364/200 MS File, 900 MS File

[56] References Cited

U.S. PATENT DOCUMENTS

| | | | |
|---|---|---|---|
| 4,142,234 | 2/1979 | Bean | 364/200 |
| 4,445,174 | 4/1984 | Fletcher | 364/200 |
| 4,493,026 | 1/1985 | Olnowich | 364/200 |
| 4,562,536 | 12/1985 | Keeley et al. | 364/200 |
| 4,736,293 | 4/1988 | Patrick | 364/200 |
| 4,814,981 | 3/1989 | Robinfield | 364/200 |

Primary Examiner—Thomas C. Lee
Assistant Examiner—Ayni Mohamed
Attorney, Agent, or Firm—Arnold, White & Durkee

[57] ABSTRACT

An apparatus which filters the number of invalidates to be propagated onto a private processor bus is provided. This is desirable so that the processor bus is not overloaded with invalidate requests. The present invention describes a method of filtering the number of invalidates to be propagated to each processor. A memory interface filters the invalidates by using a second private bus, the invalidate bus, which communicates with the cache controller. The cache controller can tell the memory interface whether data corresponding to the address on the invalidate bus is resident in the private cache memory of that processor. In this way, the memory interface only has to request the private processor bus when necessary, in order to perform the invalidate.

6 Claims, 2 Drawing Sheets

METHOD AND APPARATUS FOR FILTERING INVALIDATE REQUESTS

RELATED APPLICATION

The following patent application which is assigned to the same assignee as the instant application has been filed concurrently herewith and contains related subject matter:

Multi-Processor Computer Systems Having Shared Memory and Private Cache Memories, by Michael A. Callander, George Michael Uhler and W. Hugh Durdan, Ser. No. 7/212,347.

FIELD OF THE INVENTION

This invention relates generally to computer systems which utilize cache memory, and more specifically relates to multi-processor computer systems having multiple copies of shared data residing in any or all of the local cache memories.

BACKGROUND OF THE INVENTION

The architecture of a typical, single-processor computing system can be viewed as some variation of the von Neumann model of computation. According to this model, instructions and data are stored in the same memory, and the processor fetches instructions one by one from the memory, executing operations on data as specified in the instructions. As the speed of processors has increased, there has been a need to find ways to more suitably match the access time of the main computer memory to the computational speed of the processor. One known way of accomplishing this is through the use of cache memory which typically has a much faster access time than main memory, but can also be many times more expensive than main memory. Accordingly, as a practical consideration, it is usually much smaller than main memory.

A cache memory contains some subset of the information stored in main memory, and resides between the processing unit and the system bus, which provides the data path between a processor and main memory. When a processor attempts to access a main memory location that is copied in its cache (a cache 'hit'), no access to main memory is required to provide the requested value to the CPU, and the processor can resume operation more quickly. On the other hand, when the processor attempts to access a main memory location that is not copied in the cache (a cache 'miss'), a main memory access must occur. In this event the read data is sent to both the processor and to the cache, so that some subsequent attempts to access the memory location will result in cache hits. In this way, the effective memory access time for the processor is reduced to a value somewhere between the fast access time of the cache memory and the slower access time of main memory. Since the cache memory is usually smaller than main memory by an order of magnitude or more, the computer subsystem which controls the cache memory must employ methods of determining which memory location is to correspond to which cache location (the mapping function), and which cache location should be overwritten in the case that a new memory location is to be written into an already full cache (the cache replacement algorithm). Judicious selection of these configuration options can result in a cache 'hit ratio' (the percentage of memory access requests that result in cache hits) of 90 to 99 percent.

Another critical aspect of cache performance is the procedure that must be followed in order for a processing unit to determine whether a desired memory location is also resident in that processing unit's cache memory. Many techniques in the art exist for allowing these cache memory look-ups to be as fast and efficient as possible. The exact technique employed depends upon the particular implementation of the cache itself, especially the mapping function. Typically, however, a structure called a 'tag directory' or 'tag store' is provided to enable swift cache look-ups. A tag store is a table of multiple entries, each entry corresponding to a block of a cache memory. Traditionally, a cache block contains several main memory words, and all access to the cache is performed in units of this basic cache block size. Each tag store entry contains enough bits to specify any one of the cache blocks in the cache. When a block of data from main memory is mapped into a cache block, the tag store entry corresponding to that cache block is loaded with the higher order bits of the address of the data block in main memory. In fully associative cache designs, when the processor wants to search the cache looking for a desired main memory location, it compares the desired address to the entries in the tag store. If a match is found, the corresponding word is selected from within the multiple word cache block. In a direct mapped cache design, the least significant bits of the address of interest are used as an index into the tag store. The remaining higher order bits of the address are then compared with the tag store entries to determine a cache hit. In a set associative cache design, the least significant bits of the address of interest are used as an index into a small number (e.g. 2 or 4) of locations within the tag store, the indexed entries from each of these locations is extracted and a comparison is performed on each of this limited number of entries in parallel to determine a cache hit.

A further enhancement that is useful for decreasing the average memory access time for a CPU module is to organize the cache memory in a multi-level hierarchical structure, with the smallest and fastest primary cache memory closest to the CPU, and increasingly slower and larger secondary cache memories along the data path between a processor and main memory. Such a configuration represents a compromise between the high cost of very fast memory devices and the slower access times of relatively lower cost memory devices. A cache miss in the fastest and smallest primary cache memory causes the CPU to access the next lower cache memory in the hierarchy, where the larger size suggests an even greater probability of a cache hit. A cache miss here causes the CPU to access a secondary cache memory even lower in the hierarchy, and so on, until such time as a cache hit occurs in some level of the cache structure, or a main memory access is initiated.

Along with the increase in system efficiency resulting from the use of cache memory, however, comes the problem of data coherence. That is, there must be assurance that a cache location holds the same value as the main memory location to which it corresponds. One way to maintain data coherence is to write modified values of data contained in the cache memory both to the cache memory (if it is resident in the cache) and to the corresponding main memory location, each time memory write access to that location is requested. This method is called a "no write-allocate" write-through policy. A write-through policy may alternatively allocate a memory location for write transactions for which the memory location is not already resident in its cache, in which case the write-through policy uses a write-allocate capability. Another cache coherence technique involves a write-back policy, in which a modified data value is not written to the slower main memory until the corresponding cache location must be overwritten. The tradeoff between these policies involves the requirement of greater bandwidth at the memory subsystem level in updating main memory for each write access in a write-through policy versus the increased complexity in cache coherence in a write-back policy. In systems with sufficient bandwidth, a write-through policy is often preferred due to its simplicity.

Recent decreases in the cost of processing units have facilitated the advent of a more radical departure from the von Neumann machine organization, in which a plurality of processors operate concurrently with each other, while still accessing a common main memory space via a common system bus. Each processor can have its own private cache which resides between the processor and the system bus. For such multi-processor systems, the use of cache memories is more crucial to system performance than in single processor systems, since each of the processors is in contention with the others for use of the common system bus in order to access the shared memory. The problem of data coherence is likewise more pronounced, since the value stored in a single memory location might at one time be replicated in the private cache memory of any or all of the processors. If the local cache memories each employs a write-back policy, the system must somehow ensure that when one processor modifies the value of a memory location and writes that modification only to its cache memory, the copies of that memory location in any of the other local caches reflects the change made by that one processor.

The present invention is directed to a multi-processor computer system comprising a plurality of CPU modules which share a common memory space via a time-shared system bus. The common memory space can be realized as a plurality of memory modules each containing part of the shared system memory. A CPU module includes a processor on which instructions are executed, a private cache memory unit and possibly additional supporting hardware for efficient control of the CPU module and coordination of the CPU module with other components of the system.

As is common in the art of multi-processor systems, any of the modules interfaced to the system bus can initiate one of four kinds of transactions on the bus: null, read, write and read data transactions. The time during which one of these transactions is taking place on the bus is called a bus cycle. A null transaction occurs when no module requires the bus, and is ignored by all modules. A read transaction is one in which a CPU sends a request to a memory module to return memory data. A write transaction is one in which a CPU sends a request to a memory module to write new memory data. A read data transaction is one in which a memory module returns data to a CPU module in response to a previous read transaction. Contention for use of system bus among the various modules is arbitrated in some manner specific to the system bus implementation and known in the art of arbitration protocols.

As part of the support hardware associated with a CPU module, known techniques in the art suggest that a structure called a Read Data Queue may be introduced between the system bus and the CPU module. This structure holds data values that have been returned from memory in response to read transactions. The queuing of read data enhances the performance of the system by allowing a processor to accomplish other tasks while main memory access is made, instead of waiting idly for the data to be returned. The Read Data Queue is a first-in-first-out (FIFO) queue containing multiple entries, each of which includes a data field and a valid bit. When the CPU module receives data from main memory via a read data transaction, that data is placed on one end of the Read Data Queue, and the valid bit is set for that entry. When the CPU is ready to accept incoming data to put in its cache memory, the first valid entry is removed from the other end of the queue and the valid bit is cleared.

Another FIFO structure called an Invalidate Queue may also be introduced between the system bus and the CPU module. The Invalidate Queue also contains multiple entries called 'invalidates', each including at least an address field and a valid bit. The CPU monitors the system bus for coherence transactions. In a system employing a write-through policy, the CPU module monitors for write transactions on the system bus. When any data write transaction is detected on the system bus, the address of that transaction is placed on one end of the CPU module's Invalidate Queue and the valid bit is set. When the CPU is able to process an invalidate, the first valid entry is removed from the other end of the Invalidate Queue and its valid bit is cleared. The address of the write transaction is checked against the contents of the cache structure, and if present, the entry corresponding to that address is marked as invalid. In this way, the CPU can be prevented from using data values which are outdated.

The requirements for cache coherency in multi-processor systems are complex. One component of cache coherency in multi-processor systems is maintained when each cache memory processes transactions in the same order as they occurred on the system bus. The order of invalidates as they appeared on the system bus can be preserved by the FIFO queue that holds them. Similarly, the order of read data transactions can be preserved in their FIFO queue. Unfortunately, however, the order of invalidates in relation to read data transactions, or equivalently, the order of read data transactions relative to invalidates, as they appeared on the system bus, is normally not preserved by the use of separate Read Data and Invalidate Queues Alternative methods of maintaining cache coherence, which do not involve the use of the queues described above, also exist in the art. For example, the system could include additional hardware providing the means for direct communication between individual processor modules; or, the CPU's instruction set could include commands dedicated to preserving data coherency; or, means of direct communication could be established between main memory and each individual private cache memory. Another alternative would be to implement a global directory such that the system keeps track of what data is in each of the cache memories, allowing the system to invalidate data in a cache memory as required to maintain data coherence.

In implementing any of the above techniques, however, some expense is likely to be incurred, either in system cost or system performance. In the case of establishing paths of communication between processors or between cache memories and main memory, as well as in the case of including a global cache directory, this penalty would be primarily economic, while a modified instruction set would probably preserve data coherence at the expense of system performance.

Other systems which process every write transaction detected in order to preserve data coherence may suffer CPU (processor) bus saturation; that is, the servicing of invalidates by each CPU for every write transaction on the system bus would occupy a large amount of the multi-processor system's total computational time.

It would therefore be advantageous to implement an efficient means by which the number of invalidates propagated onto a private processor bus be "filtered", such that the processor bus not be overloaded. That is, it would be advantageous to propagate onto the private processor bus only those invalidates corresponding to memory addresses resident in that processor's cache.

SUMMARY OF THE INVENTION

The present invention provides a method and apparatus which enables a CPU module in a multi-processor system to "filter out" write transactions that would otherwise have no effect on the data in that CPU module's cache memory. In this way, the system efficiency would not be as significantly decreased due to the heavy invalidate traffic generated in a multi-processor system.

A multi-processor computer system designed in accordance with this invention includes a plurality of CPU modules interfaced to a common systems bus. These modules share access to a plurality of memory modules which define the main memory of the computer and which are also interfaced to the time-sharing system bus. The CPU modules each include, in addition to a central processor, a local cache memory used to store some subset of the information in main memory, along with the necessary hardware to control the functioning of the cache memory. In one embodiment of this invention, the local cache memories have a hierarchical structure consisting of a primary cache and a larger secondary or backup cache. Data contained in the primary cache memory could be a subset of the data contained in the backup cache memory, or the sets of data in each of the cache memories could be mutually exclusive of one another. In the former case, the problem of data coherence is further complicated by the necessity of keeping data coherent among the copies in the primary and backup cache memories of each processor module.

A processor bus in each CPU module provides the data path from the CPU to the memory interface for reading data from and writing data to either the main memory or to cache memory. The processor bus is also used to perform cache invalidates if they are required. A memory interface in each CPU module is responsible for connecting the local processor bus to the common time-shared system bus. The memory interface participates in the arbitration protocol used to manage contention for the bus among the plurality of CPU modules in the system. In addition to the processor bus, the present invention specifies that a dedicated data path be provided for direct communication between the memory interface and the cache controller logic. This dedicated data path is referred to hereinafter as the invalidate bus (I-bus) and this bus, along with the processor bus, may logically be considered as part of the memory interface.

The filtering of potential invalidates is accomplished in the memory interface of each CPU module. The memory interface monitors the common system bus for memory writes from other CPU modules. When a write transaction is detected, the memory interface communicates with the cache controller via the I-bus in order to determine whether the write transaction involves a memory location copied in the cache memory hierarchy of the CPU module. If the written location is not present anywhere in the cache memory of the CPU, the write transaction is ignored and no invalidate is forwarded to the cache controller or CPU, and the processor bus remains available for use by the CPU. If the written location is copied in the cache memory of the CPU module, the memory interface broadcasts the write transaction information over the processor bus, where it is received by the cache controller and the CPU to be processed as an invalidate. In this way, invalidate traffic on the processor bus is significantly reduced.

BRIEF DESCRIPTION OF THE DRAWINGS

The above-noted and other aspects of the present invention will become more apparent from a description of a preferred embodiment when read in conjunction with the accompanying drawings.

The drawings illustrate a preferred embodiment of the invention, wherein like members bear like reference numerals and wherein.

DETAILED DESCRIPTION OF A PREFERRED EMBODIMENT OF THE INVENTION

Figure 1:
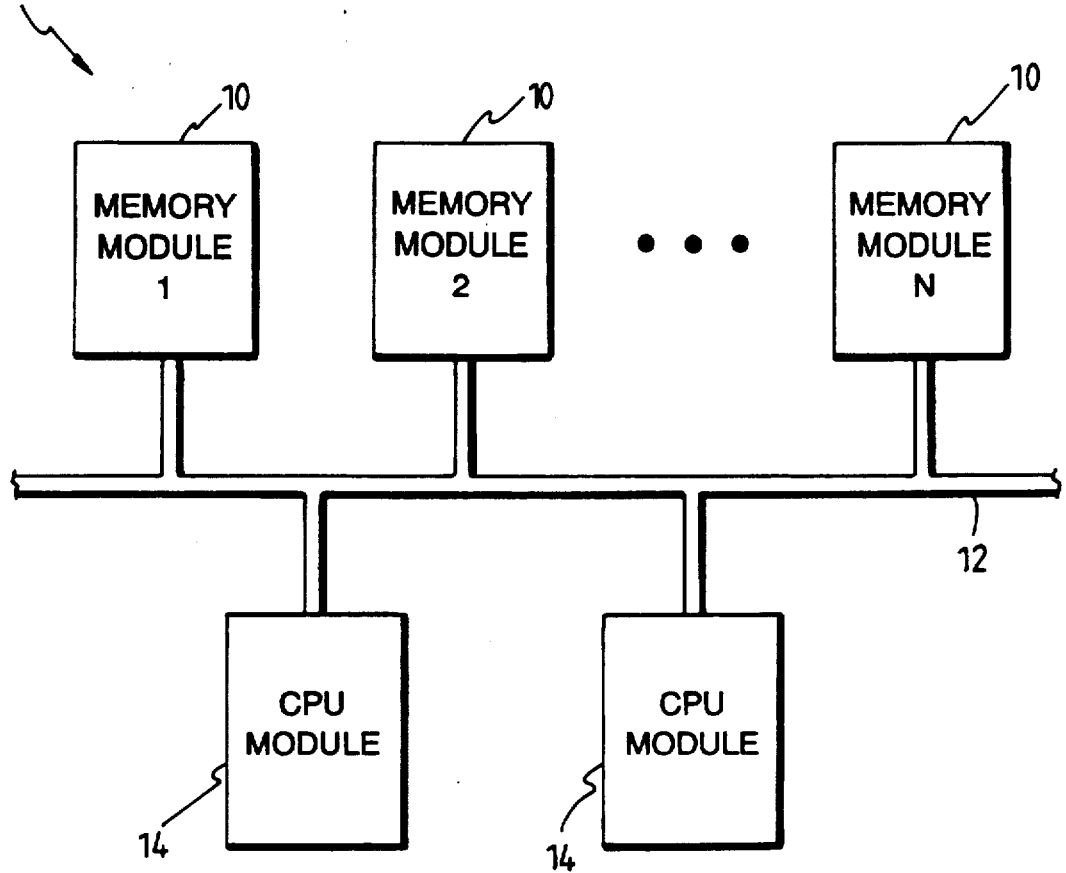
FIG. 1 is a block diagram of a multi-processor computer system, including a plurality of memory modules comprising the shared main memory and a plurality of CPU modules, all interfaced to a common system bus.

The general configuration of a multi-processor based computer system 8 in accordance with the present invention is shown in FIG. 1. A number, N, of memory modules 10 comprising the shared main memory of the system are represented, being interfaced to a common system bus 12 by means dependent upon the implementation of the bus, well known in the art. In practice, the number N of memory modules 10 can be any number greater than or equal to one, depending on the desired implementation of main memory. Although the present invention is directed to computer systems utilizing two or more processor modules 14, for clarity only two are shown.

Figure 2:
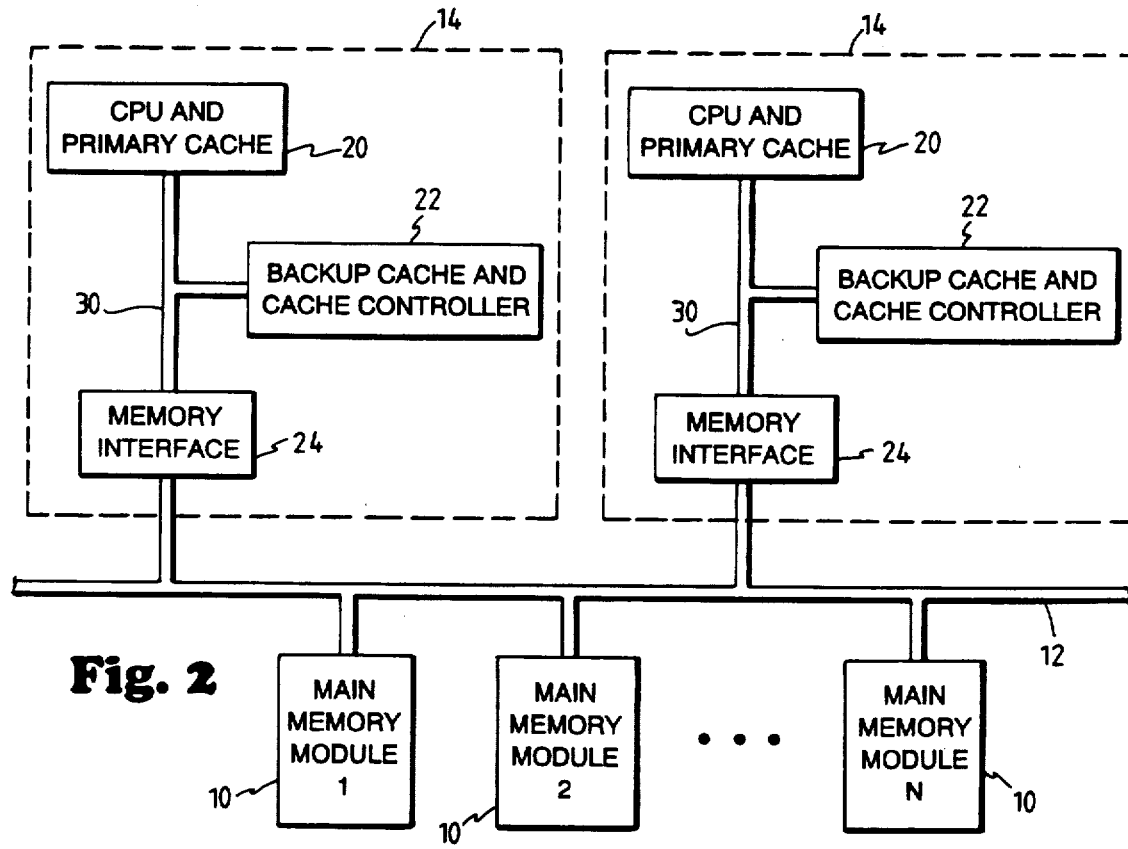
FIG. 2 is a block diagram of a similar multi-processor computer system, showing two CPU modules each having a two-level hierarchical cache memory, and each interfaced to a common system bus.

FIG. 2 shows a similar multi-processor system 8 having two CPU modules 14. Each CPU module 14 employs a two-level hierarchical cache memory structure consisting of a tightly coupled primary cache and CPU unit 20, and a backup cache/cache controller unit 22. Each CPU module 14 also includes a memory interface unit 24 which is responsible for participating in an arbitration protocol for access to the system bus 12. A processor bus 30 provides the data path for communication between the CPU 20 and the backup cache/cache controller unit 22, as well as between the CPU 20 and the memory interface unit 24 of each CPU module 14. A shared main memory for the system is implemented in the form of a plurality of memory modules 10 which also are interfaced to the system bus 12. Such an implementation and interfacing scheme for main memory is well known in the art. Furthermore, the CPU modules 14 are typical examples of CPUs which employ a two-level cache memory hierarchy.

Cache memory invalidation in the multi-processor system 8 shown in FIG. 2 proceeds as follows: The memory interface units 24 monitor the system bus 12 and detect every write transaction that appears there. For each write transaction, the memory interface units 24 send appropriate invalidation information (including the address of the write access) to both the CPU 20 and the backup cache/cache controller unit 22 via the processor bus 30 in each respective CPU module 14.

Figure 3:
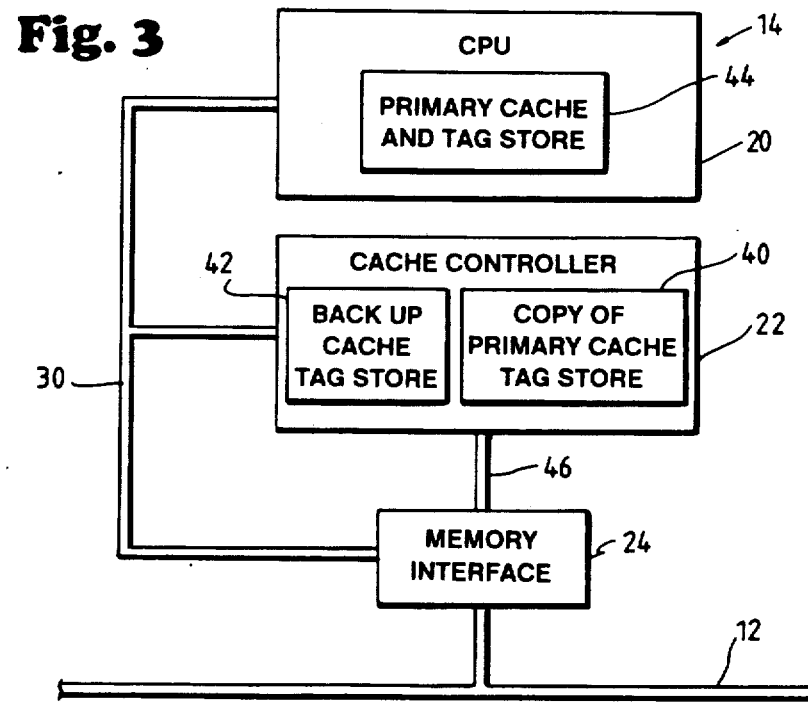
FIG. 3 is a block diagram of one of the CPU modules of FIG. 1, organized in accordance with the present invention.

The present invention describes a different configuration within its CPU modules. In particular, FIG. 3 shows one of the CPU modules 14 of FIG. 1, designed in accordance with the present invention. The CPU modules 14 are comprised of a CPU/primary cache unit 20, a cache controller/backup cache unit 22, a memory interface unit 24, and a processor bus 30 connecting the three units together, as in the typical multi-processor system shown in FIG. 2. Included within the CPU/primary cache unit 20 is a primary cache tag store 44, providing a table of multiple entries, each entry corresponding to a block of data in the primary cache memory. An aspect of the present invention, however, is the inclusion in the cache controller unit 22 of a copy 40 of the primary cache tag store 44. Another feature depicted in FIG. 3 is an additional data path 46 between the memory interface 24 and the cache controller/backup cache unit 22. This additional data path 46 is a dedicated bus referred to as the Invalidate Bus (I-bus).

Cache memory invalidation in the system of the present invention is carried out as follows: The memory interface 24 monitors the system bus 12 in the conventional manner, monitoring write transactions. When a write transaction is detected, the memory interface forwards the address of the write access to the cache controller/backup cache unit 22 via the Invalidate Bus 46. The cache controller/backup cache unit 22 queries both the backup cache tag store 42 and the copy of the primary cache tag store 40 to see if the location involved in the write transaction is resident in either the primary cache tag store 44 or the backup cache tag store 42. If the location of the write access is resident in either cache tag store, the memory interface unit 24 issues an invalidate on the processor bus 30, to be processed by either the CPU/primary cache unit 20 or the cache controller/backup cache unit 22 or both, in the customary manner. If the memory location involved in the write transaction is found not to be resident in either cache memory, no other actions need to be taken, and the processor bus 30 is left free.

In another embodiment (not shown) the cache controller is associated directly with the CPU and no backup or secondary cache is employed. The dedicated I-Bus 46 is this embodiment is coupled directly to the CPU and functions as herein described to filter invalidate requests to the processor bus 30.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in that art without departing from the spirit of the invention.

What is claimed is:

1. A method of operating a computer system, the computer system having a main memory for storing blocks of data, said compute system further having a plurality of processors capable of issuing write transactions defining invalidate requests, said computer system further having a system bus for intercoupling said main memory and said processors, each of said processors having an associated primary cache memory for storing a subset of the data stored in said main memory and a primary cache tag store for identifying blocks of memory addresses resident in said primary cache memory, each of said processors further having a memory interface for detecting write transactions on said system bus, each of said processors further having a cache controller coupled to said memory interface by an invalidate bus, said cache controller including a secondary cache memory for storing a subset of the data stored in said main memory and a secondary cache tag store for identifying blocks of memory addresses resident in said secondary cache memory, said cache controller further including a copy of the primary cache tag store, said method of operating including filtering invalidate requests by the steps of:
   a. detecting a write transaction on the system bus by a memory interface, said write transaction defining a memory location in said main memory;
   b. forwarding the memory address so defined by the memory interface to the cache controller by way of said invalidate bus;
   c. comparing said memory address to memory addresses indicated in said secondary cache tag store and in said copy of the primary cache tag store; and
   d. if said memory address is indicated in either said secondary cache tag store or said copy of the primary cache tag store, issuing an invalidate request on said processor bus, otherwise ignoring said write transaction by the memory interface detecting the write transaction.

2. A computer system comprising:
   a. a main memory means including a plurality of addressable storage locations for storing data and for generating memory control signals;
   b. a plurality of processors for processing data, each of said processors including:
      i. a central processing unit for processing data in response to instructions and for initiating transactions that access addressable storage locations in said main memory means, said central processing unit including a primary cache memory for storing a subset of the data stored in said main memory and a primary cache tag store for indicating memory addresses of the data stored in said primary cache memory; and
      ii. a cache controller including a secondary cache memory for storing a subset of the data stored in said main memory, a secondary cache tag store for indicating memory addresses of the data stored in said second cache memory and a primary cache tag store copy means for storing a copy of said primary cache tag store;
   d. a system bus for intercoupling said main memory and said processors and for intercoupling each of said processors to any other processor;
   e. each of said processors further including a memory interface providing means for receiving write transactions detected on the system bus, said memory interface including i. coupling means coupling said memory interface to said system bus for monitoring write transactions on said system bus;

ii. invalidate bus means for transmitting memory addresses associated with detected write transactions to said cache controller; and iii. processor bus means for coupling said memory interface with said cache controller and with said central processing unit wherein, if a memory address transmitted by said memory interface to said cache controller is resident in either the copy of the primary cache tag store or said secondary cache tag store, the memory address is transmitted on said processor bus by the memory interface to the cache controller as an invalidate, otherwise, said write transaction is ignored by said processor.

3. A method of operating a computer system, the computer system having a main memory for storing blocks of data, said computer system further having a plurality of processors each of said processors capable of issuing write transactions defining invalidate requests, said computer system further having a system bus for intercoupling said main memory and said processors, each of said processors having an associated primary cache memory for storing a subset of the data stored in said main memory and a primary cache tag store for identifying blocks of memory addresses resident in said primary cache memory, each of said processors further having a memory interface for detecting write transactions on said system bus, each of said processors further having a cache controller coupled to said memory interface by an invalidate bus, said cache controller including a copy of the primary cache tag store, said method of operating including filtering invalidate requests by the steps of:

a. detecting a write transaction on the system bus, said write transaction defining a memory location in said main memory;

b. forwarding the memory address so defined to the cache controller by way of said invalidate bus;

c. comparing said memory address to memory addresses identified in said copy of the primary cache tag store; and d. if said memory address is indicated in said copy of the primary cache tag store, issuing an invalidate request on the processor bus, otherwise ignoring said write transaction.

4. A method according to claim 3 wherein said cache controller includes a secondary cache memory for storing a subset of the data stored in said main memory and a secondary cache tag store for identifying blocks of memory addresses resident in said secondary cache memory.

5. A method according to claim 4 including the steps of comparing said memory address to memory addresses identified in said secondary cache tag store, and if said memory address is indicated in said secondary cache tag store issuing said invalidate request.

6. A computer system comprising:

a. a main memory means including a plurality of addressable storage locations for storing data and for generating memory control signals;

b. a plurality of processors for processing data, each of said processors including:

i. a central processing unit for processing data in response to instructions and for initiating transactions that access addressable storage locations in said main memory means, said central processing unit including a cache memory for storing a subset of the data stored in said main memory and a cache tag store for indicating memory addresses of the data stored in said primary cache memory; and ii. a cache controller including a cache tag store copy means for storing a copy of said cache tag store and a secondary cache memory for storing a subset of the data stored in said main memory and a secondary cache tag store for identifying blocks of memory addresses resident in said secondary cache memory;

c. a system bus for intercoupling said main memory and said processors and for intercoupling each of said processors to any other processor;

d. each of said processors further including a memory interface coupled to said system bus, said memory interface providing means for receiving write transactions detected on said system bus, the memory interface including i. invalidate bus means for transmitting memory addresses associated with detected write transactions to said cache controller; and ii. processor bus means for coupling said memory interface with said central processing unit; wherein, if a memory address transmitted by said memory interface to said cache controller is resident in either said copy of said cache tag store or in said secondary cache tag store, the memory address is transmitted on said processor bus as an invalidate, otherwise, said write transaction is ignored by said processor.

plurality of a. a main memory means including a addressable storage locations for storing data and for generating memory control signals; b. a plurality of processors for processing data, each of said processors including:

* * * * *

UNITED STATES PATENT AND TRADEMARK OFFICE
CERTIFICATE OF CORRECTION

PATENT NO. : 5,058,006
DATED : October 15, 1991
INVENTOR(S) : W. Hugh Durdan, Rebecca L. Stamm, G. Michael Uhler It is certified that error appears in the above-identified patent and that said Letters Patent is hereby corrected as shown below:

In column 10, lines 50-54, please delete "plurality of a. a main memory means including a addressable storage locations for storing data and for generating memory control signals; b. a plurality of processors for processing data, each of said processors including:"

Signed and Sealed this

Ninth Day of March, 1993

Attest:

STEPHEN G. KUNIN

Attesting Officer

Acting Commissioner of Patents and Trademarks